United States Patent [19]
Habegger

[11] Patent Number: 5,619,894
[45] Date of Patent: Apr. 15, 1997

[54] MULTI-SPINDLE AUTOMATIC LATHE

[76] Inventor: Harold Habegger, Sous-Graitery 10, CH-2738 Court, Switzerland

[21] Appl. No.: 318,813
[22] PCT Filed: Feb. 24, 1994
[86] PCT No.: PCT/CH94/00040
 § 371 Date: Oct. 19, 1994
 § 102(e) Date: Oct. 19, 1994
[87] PCT Pub. No.: WO94/20245
 PCT Pub. Date: Sep. 15, 1994

[30] Foreign Application Priority Data
 Mar. 1, 1993 [FR] France .................. 93 02428

[51] Int. Cl.$^6$ ........................ B23B 9/04; B23B 9/10
[52] U.S. Cl. ............................ 82/129; 29/38 D
[58] Field of Search ............ 82/120, 129, 121; 29/38 D

[56] References Cited

U.S. PATENT DOCUMENTS

| | | | |
|---|---|---|---|
| 2,912,892 | 11/1959 | Hoern ............................. | 82/129 |
| 3,688,364 | 9/1972 | Ledergerber ..................... | 29/38 D |
| 4,061,060 | 12/1977 | Trautmann ....................... | 82/129 |
| 4,665,781 | 5/1987 | Eichenhofer et al. ............ | 82/129 |
| 5,115,702 | 5/1992 | Link ............................... | 82/129 |

FOREIGN PATENT DOCUMENTS

| | | |
|---|---|---|
| 0113997 | 7/1984 | European Pat. Off. . |
| 587861 | 11/1933 | Germany . |
| 2135619 | 9/1984 | United Kingdom . |

Primary Examiner—M. Rachuba
Assistant Examiner—Kenneth J. Hansen
Attorney, Agent, or Firm—Griffin, Butler Whisenhunt & Kurtossy

[57] ABSTRACT

The invention concerns a multi-spindle automatic lathe intended for machining bars of material. Such lathe comprises: a spindle carrier (2) adapted to be displaced in rotation and translation and on which spindles (3) intended for holding bars (M) are assembled together, and bar (M) shaping means including tool bearing carriages (14) which are arranged and adapted in order to receive machining tools (12) and which are directed by control cams (16, 18) supported and driven in rotation, such lathe being characterized in that the shaping means are mounted around a central body (50) which assures the interior guidance of the spindle carrier (2) while the shaping means and the spindles (3) assembled on the spindle carrier (2) are actuated from the exterior by peripheral driving means.

29 Claims, 7 Drawing Sheets

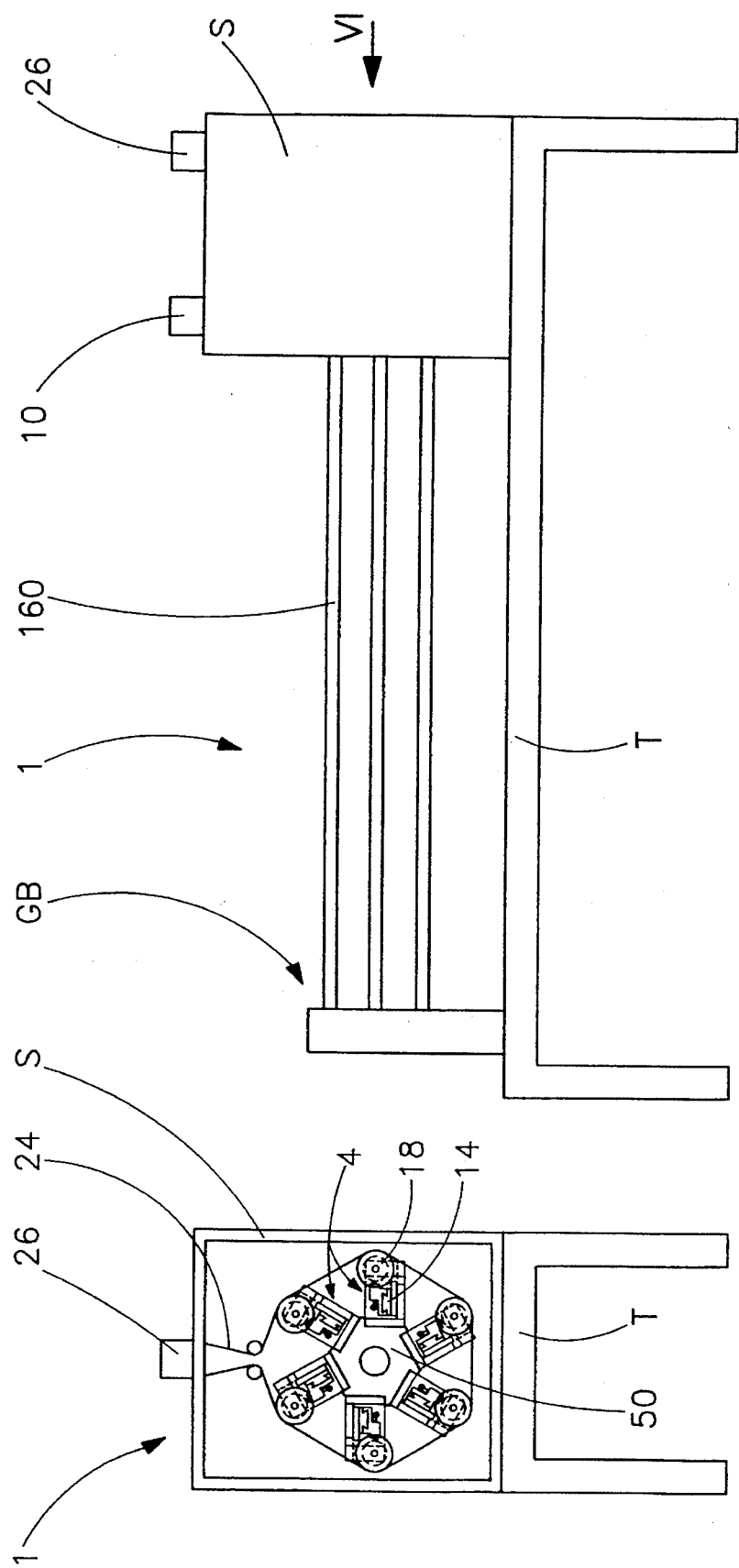

MULTI-SPINDLE AUTOMATIC LATHE

FIELD OF THE INVENTION

The present invention concerns a multi-spindle automatic lathe intended for machining and more specifically for profile turning of materials supplied in bar form.

BACKGROUND OF THE INVENTION

Known multi-spindle automatic lathes are machines of complex structure and operation, in particular from a mechanical viewpoint. Such machines include a first functional portion known as the bar support which assures the feeding, holding and driving of the bars. This part is provided with a set of spindles in which are respectively introduced the bars of material in question, which bars project from said spindles towards the cutting tools mounted on a supporting structure.

Such spindles, all of which are mobile in rotation and which in certain cases are also mobile in translation, are brought together on a spindle carrier which itself is also arranged and adapted so as to be capable of being displaced at the same time in an axial direction and in rotation, in order to assure the displacement in turn of all the bars of material towards the different machining stations. Such machining stations include tools for cutting and/or for upsetting the material and the combined motions of the spindle carrier enable bringing the ends of the bars to be machined facing the appropriate tools in order that they undergo successive transformation stages from station to station at each fraction of a rotation of the spindle carrier.

It is thus understood that such machine tools must include a great number of pinions and gears meshing together in order to be able to drive in rotation all such movable elements and so as to furnish them with the necessary mechanical torque whilst, for the rest, enabling their relative displacement, whether this be in translation or in rotation. It can thus already be noted that the high number of parts in such first functional portion leads, in known lathes, to a very substantial space requirement and weight.

Furthermore, the cutting tools are generally mounted on tool bearing carriages, likewise movable, which can be displaced generally along a single axis and which are controlled in their displacement by rotatable cams profiled in order to assure a specific displacement of the tools at each work station. The cams are all mounted on a single cam shaft driven by a motor.

Again, in this second functional portion of the lathe, referred to as the machining portion, in which are concentrated the tools and more generally the means of forming the material, numerous gears and numerous pinions for driving cams in rotation are provided, but also and above all, a multitude of arms and levers, so-called transmission mechanisms, capable of transmitting the desired translation motions from said cams to the tool bearing carriages.

Here again, it is understood that on known multi-spindle lathes this second functional portion, in addition to its complex character in respect of its construction, is massive and of very high weight.

Additionally, the parts are arranged among themselves in order that the overall volume of the machine is not too exaggerated, which further complicates the conception thereof.

It is necessary to note again that in such known lathes, the two functional portions, respectively for bar support and for machining, are supported and guided by the exterior and are installed on a very imposing rigid framework largely responsible for assuring the precision of the machining and thus its quality.

It will be further noted that in known multi-spindle lathes the machining portion is divided into two blocks between which the operator may have access in order to effect adjustments. The operator thus must be placed laterally to the right or the left of the machine which requires substantial clearance around the latter. These lathes, such as they are conceived, thus occupy a substantial floor surface which necessitates consequential infrastructures.

SUMMARY OF THE INVENTION

An object of the present invention to provide an entirely reconceived multi-spindle automatic lathe of a far simpler structure compared to lathes of the prior art, bringing into play a lesser number of parts and which includes much more direct controls, in order to increase the rigidity and the precision of the machining, whilst offering the user clearly reduced space requirements and an easier access to the tools in order to effect adjustments, and with a more advantageous price. All such elements are in effect deciding factors, for the user as well as in the definition of a machining site where several dozens of machines are installed in batteries, in front, behind and side by side one another.

Another object of the invention is to provide multi-spindle automatic lathe, intended for machining bars of material the lathe, comprising:

a spindle carrier adapted to be displaced in rotation and translation, and on which spindles intended for holding bars are assembled together, and means for shaping bars including tool bearing slides conformed so as to receive machining tools and which are directed by control cams supported and driven in rotation, such lathe being characterized in that said shaping means are mounted around a central body which assures the interior guidance of the spindle carrier, while the shaping means and the spindles integrated with the spindle carrier are actuated from the exterior by peripheral driving means.

According to another characteristic, the lathe according to the invention includes modular machining units forming said bar shaping means, such units each including, in an integrated manner, a tool bearing carriage as well as one or several cams intended for the displacement of said carriage.

According to one aspect of the invention, each modular machining unit includes, in an integrated manner, its own cam shaft which is supported for rotation on a chassis mounted on the exterior of the central body.

According to another aspect of the invention, each modular machining unit furthermore includes a driving wheel mechanically anchored on the cam shaft. The driving wheels of the modular machining units are driven concomitantly by an exterior notched belt surrounding the central body.

Furthermore, each rigid chassis includes a frontal plate extending radially from the central body, each plate supporting rigidly one end of the cam shaft and, according to a special embodiment, a guide pipe.

Other objects, characteristics and advantages of the present invention will appear more clearly upon reading of the detailed description which follows, given by way of example and making reference to the attached drawings.

BRIEF DESCRIPTION OF THE DRAWINGS

FIGS. 5 and 6 are respective views from the side and the face (seen from the front) of the lathe of FIGS. 1 to 4 mounted, according to a first variant of the installation, on a non-rigid table;

DESCRIPTION OF THE PREFERRED EMBODIMENTS

Figure 1:
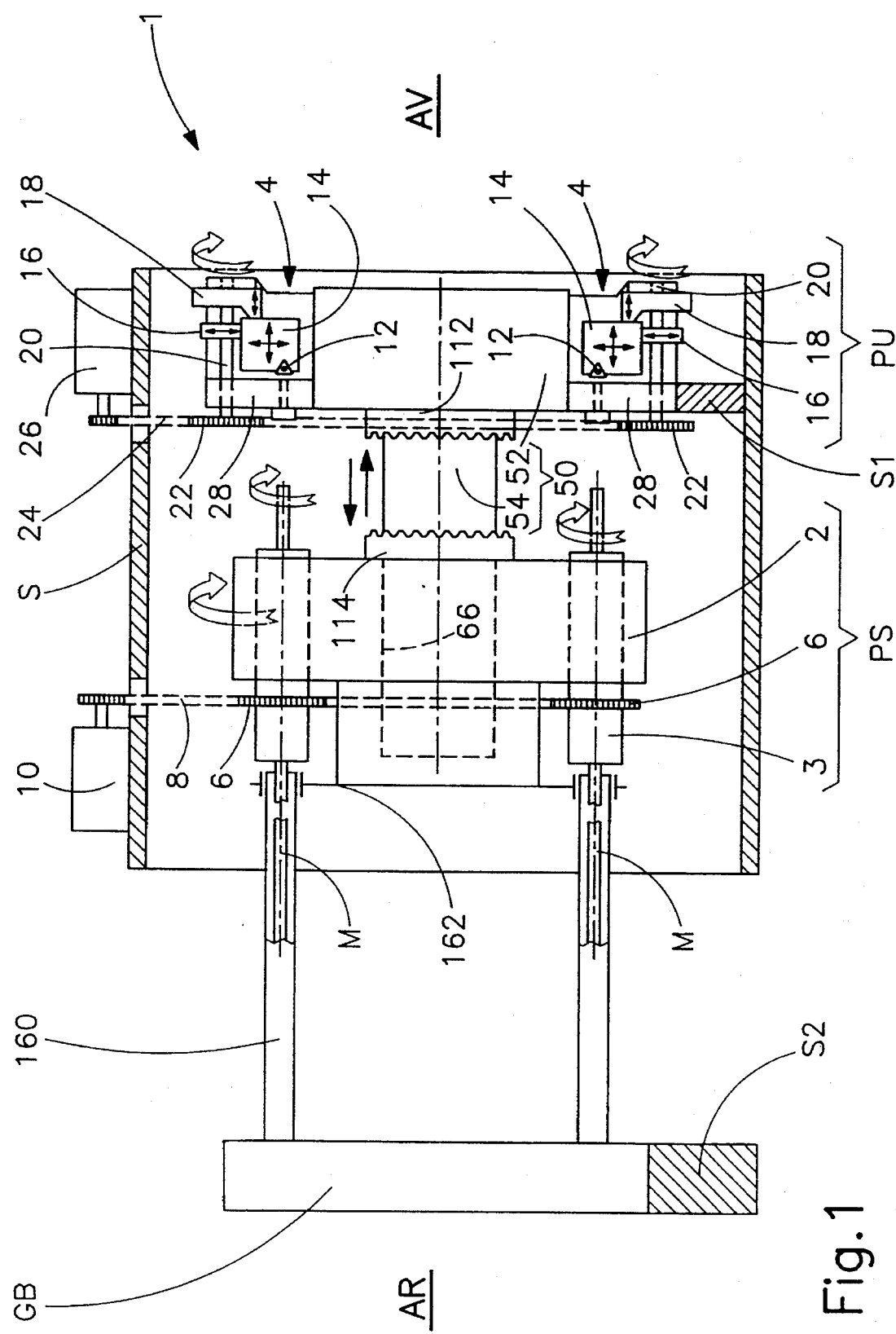
FIG. 1 is a very schematic elevational view of the automatic lathe according to the invention.

Referring henceforth to FIG. 1, there will be described the principle of construction and operation of the multi-spindle automatic lathe according to the invention, shown on this figure in a very schematic manner and identified by the general reference 1.

The lathe 1 according to the invention includes a spindle carrier 2 on which are assembled together a plurality of spindles referenced 3 angularly displaced relative to one another. On this figure only two of spindles 3 have been shown in order to better understand the drawing, but it is well understood that a much greater number of spindles can be provided, for example 4, 6, 8, 10 or 12.

As is seen clearly on this figure, in the interior of each spindle is introduced a bar of material referenced M, a free end of which projects from the corresponding spindle 3 in order to be transformed, that is to say, to be machined by removal of chips and/or by upsetting material through shaping means identified by the general reference 4 and described in a more detailed manner hereinafter.

The bars of material M are generally of substantial length and are supported at their other end by a bar guide GB assuring also the feeding of bars M into lathe 1. The bar guide GB is solidly secured behind spindle carrier 2 by known securing means, such as nut-bolt assemblies, not shown.

Spindles 3 respectively include driving wheels 6 at the back thereof to which they are fixed in rotation. Spindles 3 are themselves of known conception and will not be described in greater detail.

The driving wheels 6 are, in this embodiment, formed by exteriorly notched pulleys with which a first notched driving belt 8 is engaged, capable of driving all the driving wheels 6 and thus the different bars of material M in concomitant fashion through the spindles 3.

Belt 8 is engaged with a first driving motor 10 fixedly mounted on a non-rigid framework S which will be described hereinafter in a more detailed manner.

Thus, the driving wheels or pulleys 6, notched belt 8 and motor 10 constitute first driving means intended to drive spindles 3 in rotation around their rotation axis, not shown.

For the rest, it is understood that these elements which have just been described constitute a first functional portion of lathe 1 capable of assuring feeding and driving of the bars, such portion which is referenced PS being referred to as the support portion of the bars.

As has been specified hereinbefore, the automatic lathe 1 according to the invention includes shaping means 4 for the bars of material M, such means permitting the machining, in particular by removal of chips and/or by cold deformation of the material making up the bars. To this effect, such shaping means 4 include a plurality of tools 12, here shown in a very schematic manner in the form of cutting tips.

The shaping means 4 furthermore include tool-bearing carriages 14 capable of being displaced at least along one working axis and preferably along two, generally identified in the technology in discussion, by references X and Z. Such types of carriage which are referred to as compound carriages are of known conception and will be not be described here in more detailed fashion.

On each of such carriages 14 is fixedly mounted, through clamps and screws not shown, one of the tools 12 in a manner such that the carriages assure, during machining, displacement of each tool individually relative to bars M.

The shaping means 4 further include several control cams 16 and 18 which are adapted so as to direct the appropriate displacement of tools 12, via the tool bearing carriages 14. In the preferred embodiment and in an advantageous manner, it will be noted that the displacement of each carriage and thus of each tool 12 is directly controlled by two of the above-mentioned cams, the first, referenced 16, being a standard disc cam with profiled contour, while the second, referenced 18, is a bell cam, also of known form, that is to say, profiled at the end.

Here it will be specified that the two cams, respectively 16 and 18, act by direct contact on the respective tool bearing carriages 14, and thus without interposition of elements such as intermediate arms or levers subject to bending stresses.

Thus, each tool 12 as well as its support elements formed by one of carriages 14 and its control means formed by cams 16 and 18 together constitute, at the heart of the different shaping means 4, a machining or work station where are effected one or several specific machining operations on the corresponding free end of one of the bars of material M. As is understood, it is the successive passage of the free machined end of the bars of material M, to these different work stations which assures transformation of the material and provides it with the desired forms and functions.

To this effect, it will be noted that at each work station the two cams 16 and 18 are mounted on a sole and unique cam shaft 20 on which is fixedly engaged, in particular for rotation, a driving wheel 22 formed by an exteriorly notched pulley. The driving wheels 22 of shafts 20 are engaged with a notched driving belt 24 driven by a second motor 26 which is fixedly mounted on the non-rigid framework S. Thus, at each each machining station at the heart of each shaping means 4, the two cams 16 and 20 which are mounted on a common shaft 20, are driven in concomitant fashion via a driving wheel 22 under the action of the second driving motor 26.

Figure 2:
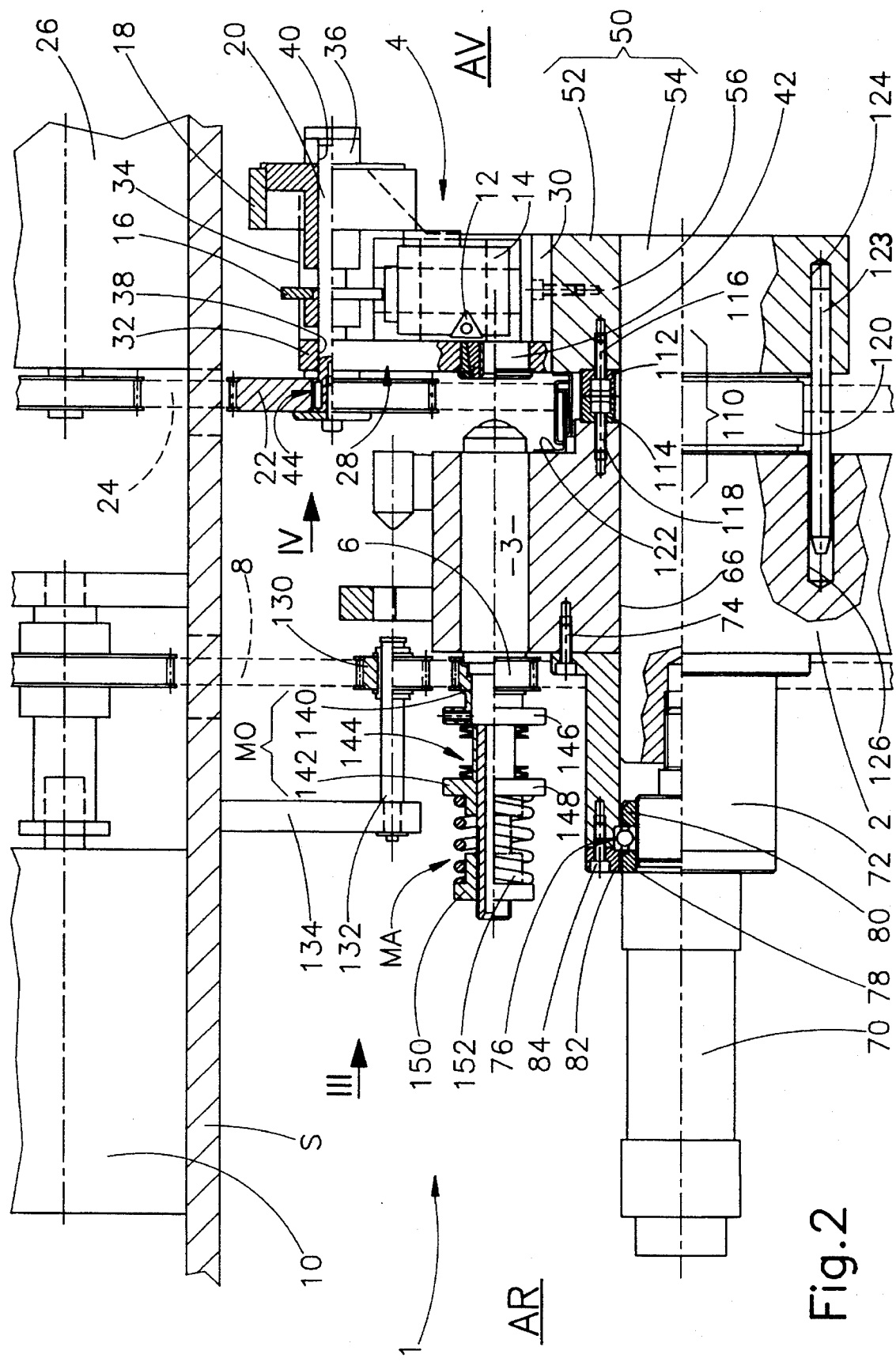
FIG. 2 is a view of the lathe of FIG. 1 shown partially and along a half-section taken along line II—II of FIGS. 3 and 4 and on which certain parts have been omitted for the sake of clarity in the drawings.

In the remainder of the description, there will be designated by "front" and "back" the regions of lathe 1 referenced respectively AV and AR in conformity with the position of the lathe such as shown on FIGS. 1 and 2. Thus, spindle carrier 2 and bars M extend basically towards the back AR of lathe 1 while the shaping means 4 are basically positioned towards the front AV.

In referring henceforth more specifically to FIG. 2, there will be described in greater detail the elements making up the automatic lathe according to the invention, which have been described hereinbefore with reference to FIG. 1. It will be noted that on this figure, the respective notched driving belts 8 and 24 have been shown only in a partial manner in broken outline.

As is seen on this figure, at each machining station, a tool bearing carriage 14, two cams 16 and 18 as well as the driving wheel 22 are mounted on a rigid chassis 28 which carries and guides in rotation the cam shaft 20 supporting the rotative elements 16, 18 and 22. More specifically, each rigid chassis 28 is made up of four plates, namely a base plate 30, a frontal or forward plate 32, a lateral plate 34 and a back plate 36. Such four plates are fixedly held together by known securing means, not shown, such as, for example, by screwing, welding or gluing. In conformity with another embodiment, not shown, such four plates 30, 32, 34 and 36 can be integral and formed in a monoblock fashion by moulding in a single piece.

The rigid chassis 28 thus constituted by its four plates 30, 32, 34 and 36 includes two bearings, respectively 38 and 40, which support the cam shaft 20 in rotation.

Bearings 38 and 40 are respectively formed by guide bores formed in the one case in the frontal plate 32 and for the other in the back plate 36.

Thus, the two cams 16 and 18 being supported on one and the same cam shaft 20, while such cam shaft 20 and a corresponding tool bearing carriage 14 are precisely mounted and positioned together on a common rigid chassis 28, it is understood that there are obtained, during shaping of the material of the bar M, machining geometries which do not vary, whatever be the speed of rotation of the driving wheel 22 and thus whatever be the progression of the notched driving belt 24.

It will further be noted that in this embodiment, the frontal plate 32 includes a guide pipe 42 of known structure held by jamming therein and intended to receive the free end of the bar of material M during machining. It is thus understood that each frontal plate 32 supports in rigid fashion an end of a cam shaft 20 and a guide pipe 42 which are thus positioned relative to one another in an extremely precise and stable manner. Thus, the axis spacing between a cam shaft 20 and a corresponding guide pipe 42 remains constant whatever be the stresses undergone by lathe 1.

Thus, it is understood from what has just been described that such shaping means 4 are arranged respectively in the form of modular machining units, each including in an integrated manner, machining means, that is to say, here a cutting tool 12, their support means and their control means, namely a tool bearing carriage 14 and the two cams 16 and 18 intended for the displacement of the carriage as well as a portion of the driving means of said cams 16 and 18 formed by the driving wheel 22.

According to an embodiment, not shown, solely one cam can be provided on each machining unit in order to effect a simplified shaping operation along a single axis. In a variant of the embodiment, not shown, the guide pipes 42 can be omitted. It is also understood that each modular machining unit 4 such as described forms a working station in itself at the level of which one or several different shaping operations, here by removal of chips, are brought about. To this end and as will be explained hereinafter, the ends of the bars of material M come successively to be presented to such machining stations by the combined displacements of the spindle carrier 2. The cutting tools have been shown on FIGS. 1 and 2 in the form of machining tips intended for working known as turning, that is to say, by combined movements according to several axes. It will be specified that such tips can be replaced by other tools, such as drills, permitting axial piercing of bars M.

It will thus be noted that in an advantageous manner, each machining station includes its own cam shaft 20 which acts on a tool bearing carriage 14 in the most direct manner possible, that is to say, through the control cams which the shaft supports in rotation, the whole being mounted on a common frame.

Furthermore, each modular machining unit 4 includes a driving wheel 22 forming part of the second driving means of the lathe 1 according to the invention, this wheel being mechanically anchored on the corresponding cam shaft 20 by known means of coupling in rotation, such as key and slot assemblies referenced 44. It is thus understood that the elements which have just been described constitute a second functional portion of the lathe 1, reference PU and referred to as the material machining portion (FIG. 1).

For the rest, lathe 1 according to the invention includes a rigid central body 50 formed by a sleeve 52 and an axle or shaft support 54 fixedly engaged by driving or gluing in sleeve 52. In conformity with another embodiment, not shown, sleeve 52 and axle 54 can be integral and be formed, for example, by moulding. As can be determined, in particular from FIG. 2, the base plates 30 of the modular machining units 4 are fixedly mounted on the central body 50, for example by screws 56 (only one being shown on the figure) radially engaged in sleeve 52.

Figure 4:
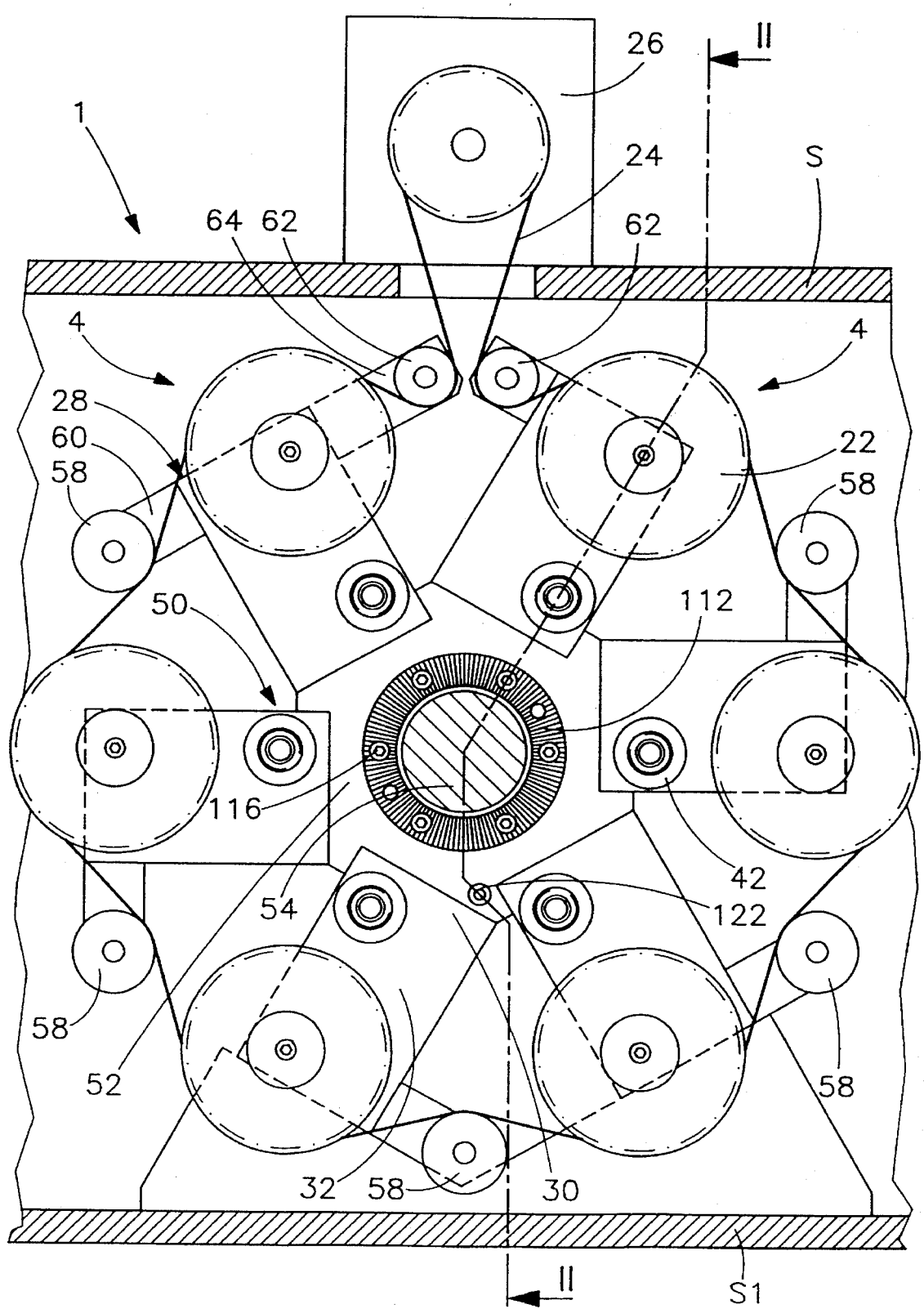
FIG. 4 is a view similar to FIG. 3, but showing according to arrow IV of FIG. 2, the second functional portion of the lathe according to the invention, formed by a central rigid body provided with modular machining units assembled at its periphery and equipped with their drive belt.

As is seen more specifically on FIG. 4, lathe 1 according to the invention includes in this example six modular machining units 4 mounted in a peripheral manner around the rigid central body 50 according to an arrangement referred to as fan form or planetary form.

As is seen on this figure, all the exterior notched driving wheels 22 of the six machining units 4 are driven together in a simultaneous manner through the peripheral driving belt 24 which surrounds the machining portion PU. The peripheral belt 24 is tensioned on such wheels 22 through presser idlers 58 freely mounted for rotation on arms 60 which extend respectively from the frontal plate 32 in a radial direction and which are secured on the latter by screwing thereon, for example. For the rest, the two modular machining units 4 which are closest to motor 26 include idler pulleys 62 likewise supported at a distance from the driving wheels 22 in a radial direction, in a common plane, through other arms 64 respectively fixed to two of the frontal plates 32, likewise by screwing thereon.

Referring back henceforth to FIG. 2, it will be noted that the spindle carrier 2 is guided solely by the interior in being mounted directly by a sliding fit on the axis or support shaft 54 which extends longitudinally from the central body 50. To this effect, the spindle carrier 2 includes a bore, likewise centrally located, referenced 66 in which is engaged the support shaft 54. Thus, the spindle carrier 2 thanks to this engagement and thanks to such holding, is positioned and can be freely displaced in translation as well as in rotation relative to lathe 1 directly and basically by an interior guidance on the central body 50 which bears at its periphery the modular machining unit 4 and the driving belt 24. It is thus understood that the support shaft 54 of the central body 50 and bore 66 of the spindle carrier 2 constitute the guidance means for such spindle carrier. Here it will be noted that the central body 50 forms the basically rigid portion of the lathe which alone supports the spindle carrier 2 as well as all the modular machining units 4.

The support shaft 54 extends back of the spindle carrier 2 by the arrangement of an actuating means, in particular pneumatic, formed by a thruster 70 which is fixedly mounted, in particular by screwing it onto the support shaft 54 in the extension of the latter and at its free end. The spindle carrier 2 includes on the side opposite the central body 50 a flanged socket 72 fixedly mounted on the spindle carrier 2 by a set of screws 74 of which only one is shown on FIG. 2.

The spindle carrier 2 is secured in translation to the movable portion of the thruster 70 through the socket 72 with interposition of a bearing 76, for example a ball bearing. Bearing 76 is fixedly held by its inner race, not referenced, on the movable portion of thruster 70 via a back support ring 78 and a nut 80 directly screwed onto the thruster 70. Bearing 76 is furthermore axially held in a fixed manner within the socket 72 on the one hand against a shoulder, not referenced, formed on the back of such socket and, on the other hand, against a crown 82 fixedly held on socket 72 by a set of screws 84 of which one only is here shown.

Thus it is determined that spindle carrier 2, thanks to the socket 72, is coupled to the movable portion of thruster 70 and can be displaced in translation under the action of the latter because of the coupling in translation furnished by the assembly of the ball bearing 76. At the same time, thanks to such bearing, the spindle carrier 2 is movable in rotation relative to thruster 70. It will be specified that thruster 70 includes a set of pneumatic ducts which assure the circulation of air in the latter; such ducts, not shown, being coupled to a control center of known type, likewise not shown.

Figure 3:
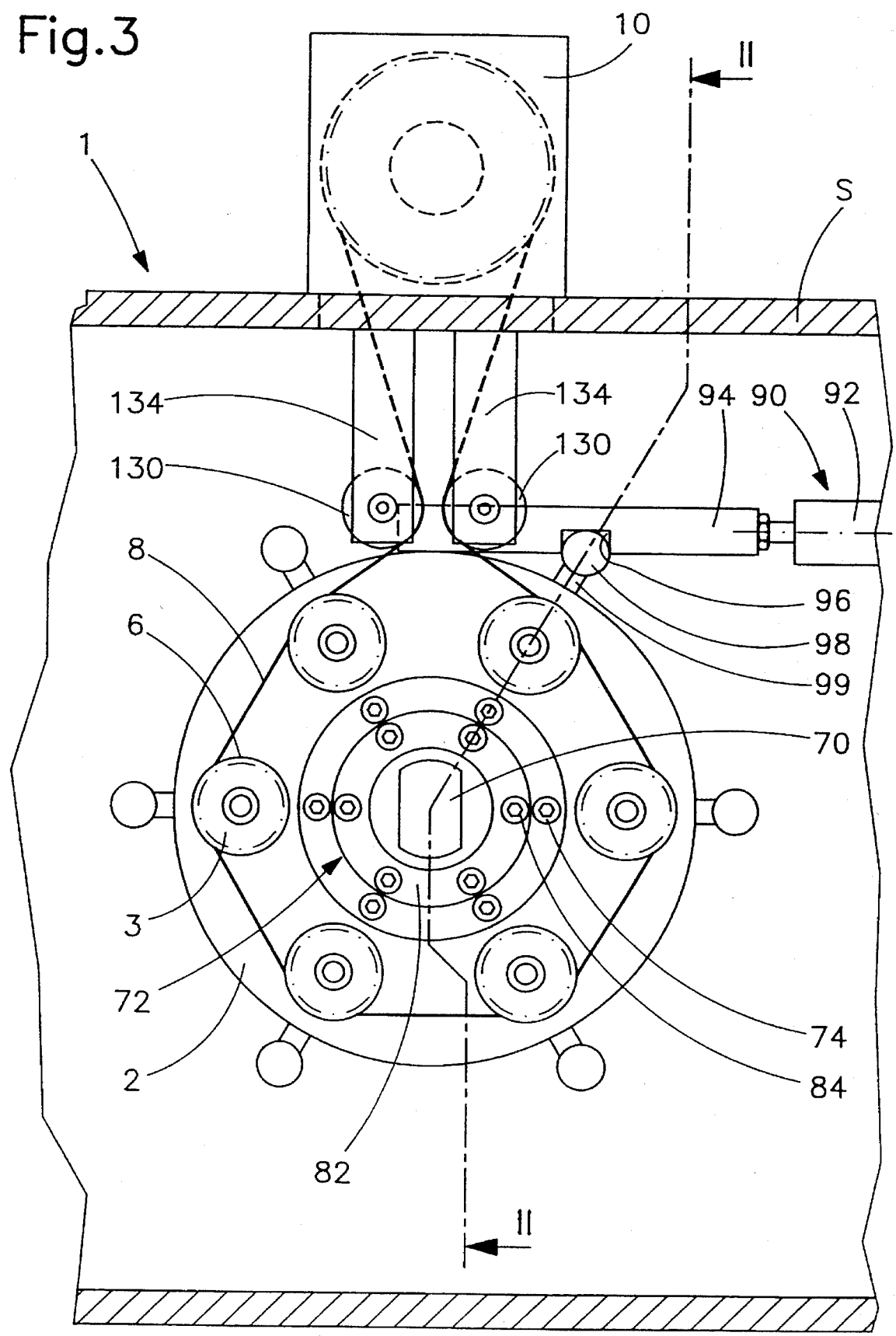
FIG. 3 is a view taken from the back of the lathe of FIGS. 1 and 2 according to the arrow III of FIG. 2 and on which have been shown only the first functional portion of the lathe according to the invention, formed by a spindle carrier drum provided with its drive belt.

As is seen more specifically on FIG. 3, lathe 1 according to the invention further includes an arrangement 90 directing the angular displacement step by step of the spindle carrier 2 when it is drawn toward the back AR by the thruster 70. This arrangement includes a thruster 92 pneumatically powered by control means, not shown, and the movable portion of which is provided with a finger 94 including a notch 96 adapted to receive the head 98 of an indexing pin 99 projecting exteriorly and in a radial direction from the outer periphery of the spindle carrier 2. Thus, when the spindle carrier 2 is driven in translation towards the back by the thruster 70, head 98 of one of the pins 99 comes into engagement with notch 96, then the run-out of finger 94 displaces the spindle carrier 2 angularly on the support shaft 54. Thruster 70 then brings back the spindle carrier 2 provided with bars of material M towards the front AV, that is to say, towards the machining units 4 for a new machining operation. In the meantime, the finger 94 is brought back into its original position shown on FIG. 3 in order to be ready to receive another head 98.

Additionally, lathe 1 includes means 110 (FIG. 2) permitting the stable angular positioning of body 50 relative to spindle carrier 2 during machining. The angular positioning means 110 are constituted by two crowns, respectively 112 and 114, including frontal teeth, not referenced, facing one another. Crown 112 is fixedly mounted on sleeve 52 of the fixed body 50 through screws 116 of which one only is shown on FIG. 2, while the crown 114 is fixedly mounted on the spindle carrier 2 by means of a set of screws 118 of which there as well a one only is shown. Thus, when the spindle carrier 2 sufficiently approaches the fixed central body 50 in being pushed towards the front AV under the action of thruster 70, the teeth of crowns 112 and 114 mesh together in order to position spindle carrier 2 angularly and in order to maintain it fixed in rotation relative to the fixed body 50 and, in particular, relative to the six modular machining units 4. When such relative positioning is brought about by meshing of the teeth in question, the bars of material, not shown, are correctly positioned to be adapted to be machined by the cutting tools 12.

It will be noted that lathe 1 further includes protection means for the teeth of crowns 112 and 114, such means being constituted by two casings, one referenced 120 which is fixedly mounted on sleeve 52 of body 50 in a manner coaxial to the toothed crown 112 and around the latter, the other, referenced 122, is adapted in order to come to interleave in the casing 120 and is fixed to the spindle carrier 2. Such casings are respectively fastened to the body 50 and to the spindle carrier 2 by known means such as by screwing or welding.

For the rest, in order to assure correct engagement of the machined end or to machine bars of material M in the corresponding guide pipes 42 of the modular machining units 4, the lathe 1 according to the invention includes a positioning stud 122 which is driven into the sleeve 52 of the fixed body 50 and which is arranged and adapted so as to be engaged, during the thrusting of spindle carrier 2, in one of the corresponding bores 124 arranged longitudinally in said spindle carrier.

As is seen more specifically on FIG. 3, the notched belt 8 which is driven by the first motor 10 meshes with the six notched driving wheels 6 of the corresponding spindles 3. Thus, the notched belt 8 surrounds the six driving wheels referenced 6, so that the latter can be displaced in an angular manner from one machining position to another, whilst continuing to be driven by such belt 8 without there being a pinching of such latter.

In order to assure the tensioning of belt 8, the non-rigid framework S includes two idlers 130 arranged in the neighbourhood of the spindle carrier 2 and mounted in cantilever on axles 132 fixedly assembled, for example by screwing, on a foot 134 extending vertically from chassis S. The idlers 130 can be displaced in rotation, but as well in translation on their respective axles 132. It is thus noted that the spindles 2 are driven by the belt 8 according to a so-called exterior or peripheral configuration.

Here it will be further specified that spindles 3 each include a chuck opening mechanism referenced MO. Such chucks, which are arranged respectively on the interior of said spindles, are not shown here. The spindles 3 further include a mechanism MA permitting advancing of the bar of material M on the interior of spindles 3.

The mechanism MO enabling opening of the spindle chuck which will not be described here in a detailed manner since of known design, includes two sleeves one fixed referenced 140 and the other movable referenced 142, with the interposition between the latter of elastic compression means, in particular spring washers 144. The two respective sleeves 140 and 142 include respective end plates 146 and 148 which are designed in order to be able to cooperate with cams, not shown, arranged in a predetermined angular position of the spindle carrier in order to permit the opening of the spindle chuck, in particular when the bar of material M has undergone appropriate machining and the shaped portion on the latter has been cut off. Thus, by such system of cams, not shown, the two ends plate 146 and 148 are urged towards one another, which brings about the approaching of the sliding sleeve 142 towards the sleeve 140 held by a back support and a subsequent opening of the spindle chuck. Over an additional fraction of a turn, the cam profile, not shown, enables an additional displacement of the sliding sleeve 142 and displacement towards the front of ring 150 screwed to the back end of spindle 3. Thus, the advancing of ring 150 of the mechanism MA enables advancing of the bar to be machined M towards the shaping means 4 for the presentation of a new region to be machined. During the approach of the ring 150 towards the sliding sleeve 142 a compression spring 152 interposed between these two elements is compressed. The two springs 152 and 144 enable the return of the sliding sleeve 142 and of ring 150 towards the original position shown on FIG. 2 in order to assure closing of the spindle chucks.

It is understood from what has just been described that lathe 1 according to the invention includes guidance means for the spindle carrier 2 formed according to an interior or central configuration relative to lathe 1, while the different driving means, in particular for spindles 3 and for machining units 4 formed respectively by the belts 8 and 24 have an outer or peripheral configuration which leaves free the interior of lathe 1 for the arrangement of said guidance means. From this fact and as has been shown more clearly on FIG. 9, the adjustments of the machining functional portion PU can be effected from the front AV of lathe 1 since the non-rigid framework S is longitudinally open at its two ends.

Figure 9:
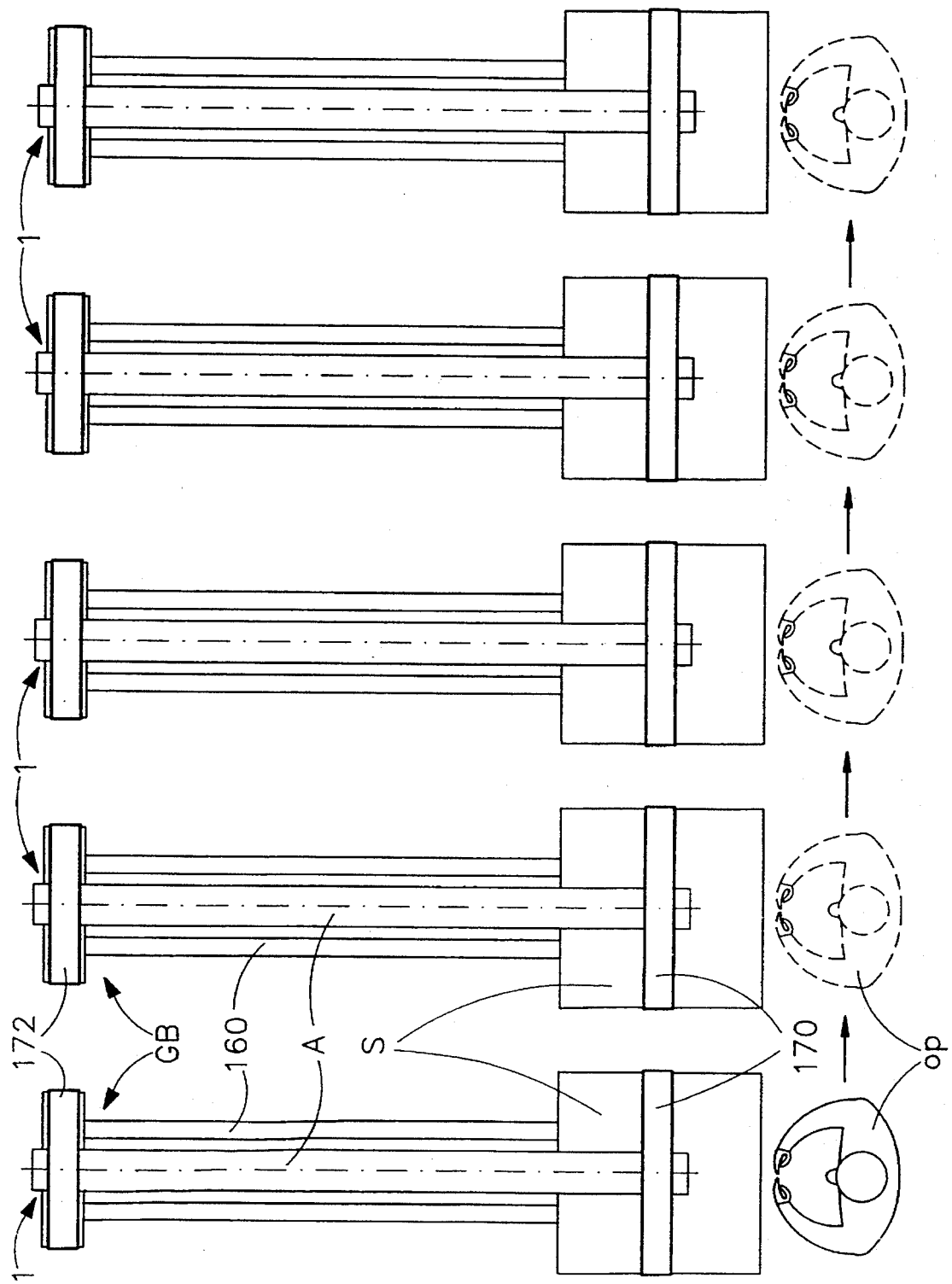
FIG. 9 is a top view of a group of lathes in the presence of an operator at a machining location.

As is seen more specifically on FIG. 9 where there are shown several lathes 1 in conformity with the invention, the operator can gain access easily to the elements to be adjusted and in particular to cams 16 and 18, to carriage 14 and to the tool 12 which permits effecting the adjustments without having to move from side to side of the lathe. There is thus a so-called frontal configuration which provides space saving and enables proximity of the lathes beside one another.

As is seen on FIG. 1, the machining portion PU is placed on a support S1 which is seen more specifically on FIG. 4 and which is generally in V form. On such support rest two frontal plates 32 as well as one of the arms 60 which supports one of the idlers 58.

Support S1 is fixedly held on the interior of the non-rigid frame S.

The lathe 1 is further supported through a second support S2 on which rests the rear of the guide bar GB.

As is shown in a very schematic manner on FIG. 1, guide bar GB includes a set of tubes 160 corresponding to the number of spindles 3 and associated respectively with spindles 3 at the back of the latter.

The guide tubes 160 are slidingly mounted on a plate 162 which is secured to the rear of spindle carrier 2 by standard means of screw fastening. Guide bar GB is thus coupled to the rear of spindle carrier 2 through plate 162 which enables relative displacement in translation of spindle carrier 2 and spindles 3 relative to guide bar GB and, in particular, relative to tubes 160.

Referring henceforth to FIGS. 5 and 6, there will hereinafter be described a first variant of the installation of lathe 1 according to the invention. As is seen on these figures, the non-rigid framework S as well as the guide bar GB are directly set on a non-rigid table T showing an open structure. It is thus understood that the two functional units of lathe 1 according to the invention, namely the support portion of bar PS which is associated with the guide bar GB and the machining portion PU which is arranged on the interior of the non-rigid frame S form an autonomous self-supporting structure which can work with great precision and with easy access whilst being capable of installation on any type whatsoever of support without the strains or vibrations of such support (here the non-rigid table T) bringing about variations in the machining quality. The rigidity of the system being concentrated about the central body 50 as well as at the level of the rigid frames 28 which support the control means, the driving means and the tool support means, it has been possible to provide a configuration of which the outer framework can exhibit very small thicknesses, such as shown for the non-rigid frame S and table T. There has thus been obtained a multi-spindle automatic lathe having a frontal configuration of simple conception opened out to the extent possible and thus of small weight with direct controls and with space occupation also greatly reduced.

Figures 7, 8:
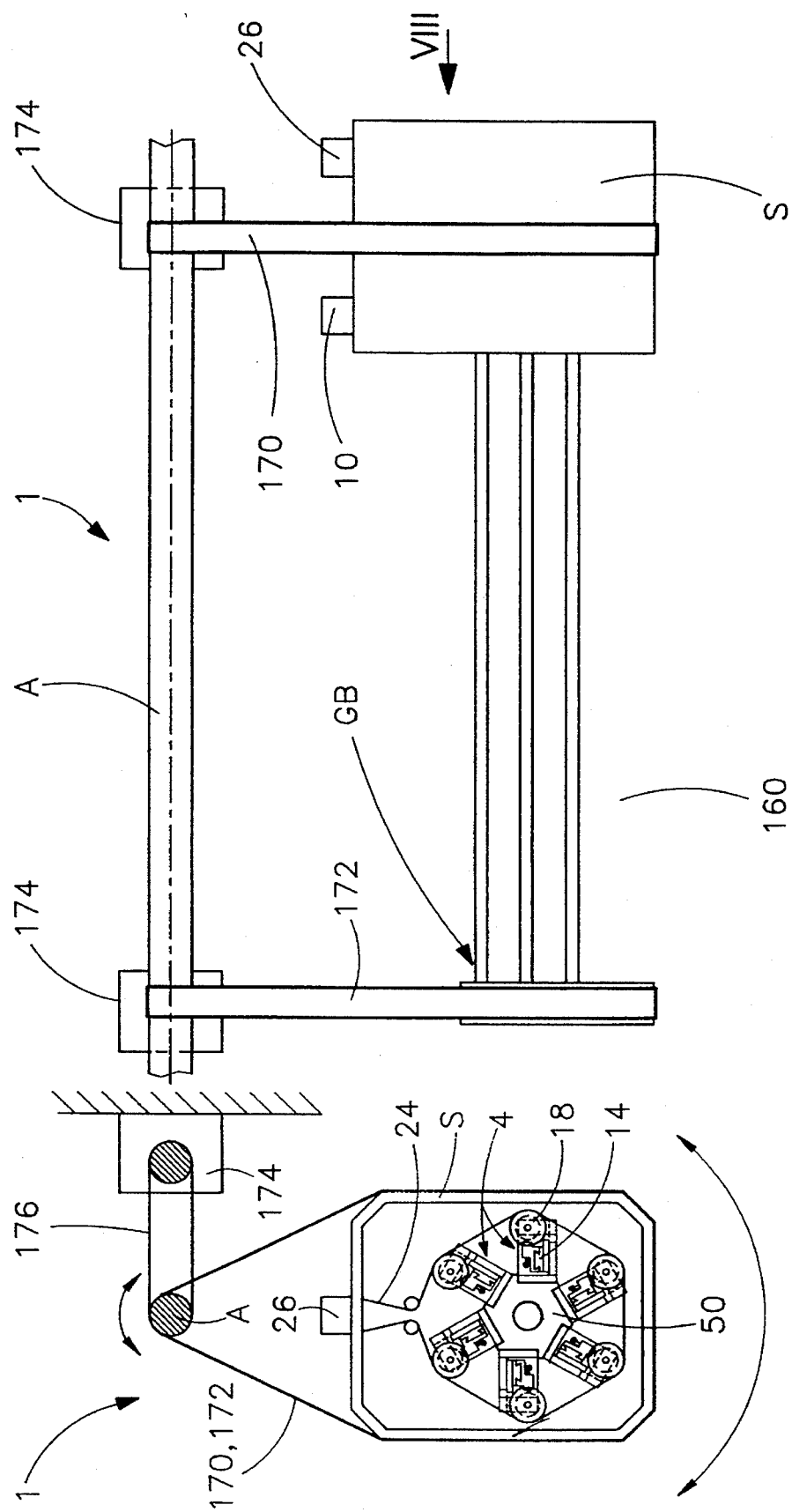
FIGS. 7 and 8 are views similar to FIGS. 5 and 6, but showing the lathe according to the invention, in accordance with a second installation variant, suspended on a beam by belts in order to give it an oscillating motion for removal of chips.

Referring henceforth to FIGS. 7 and 8, there will be described hereinafter a second variant of the installation of the lathe according to the invention.

In this embodiment it is seen that lathe 1 is suspended from a beam or shaft A coupled in a rigid manner to the floor by means not shown. Lathe 1 is maintained on such shaft or beam A through two chains or cables 170 and 172 respectively surrounding the non-rigid frame S and the back of the guide bar GB. To this effect, it is noted in particular on FIG. 8 that the form of the non-rigid frame S has been slightly rounded off in order better to cooperate with the chain or cable 170. The shaft or beam A being driven by one or several motors with speed reducer 174 through one or several belts or chains 176, lathe 1 can thus be provided in its totality with a relatively slow oscillating rotational movement which enables the removal of chips and the extraction of machined parts in the course of machining.

As has been explained hereinbefore, FIG. 9 shows a battery of lathes 1 suspended from several beams A and facing which an operator OP can move in frontal position relative to the lathes 1 to bring about the different adjustments and to check the operations effected by tools 12. It is also specified that under such lathes 1 can be respectively placed different tubs intended for the recovery of such chips (not shown).

Although on FIGS. 2 to 8 described hereinbefore there has been shown a lathe with six machining stations, the invention enables without any difficulty to design according to the demand lathes with eight, ten, twelve, etc. machining stations, evidently with a spindle carrier including the same number of spindles 3 and this since each machining station is constituted by a modular machining unit 4 which includes its own cam shaft and its controls acting directly on its carriage 14. Thus, for the conception of a lathe with a given number of machining stations, there can be used the same type of modular machining unit 4 which is assembled on any body 50 whatsoever having, as is well understood, an appropriate number of faces for the assembly of such units. It will also be specified that, although the modular machining units 4 have been described in association with a guide pipe 42 for the machining of parts bearing outwardly from the spindle 3, there can be furnished a lathe with machining stations not including such type of pipe for work on parts which project only a few millimeters from the corresponding spindle. The work in pipe so-called, functions on the known principle of movable head stock lathes and in the configuration as described, this type of work offers an extremely high machining precision from the fact that the pipes 42 are assembled on the same rigid part (namely the frontal plate 32) as the supports for the cam shafts 20 which provides a stable separation and eliminates all types of variations due, in known lathes, to the intermediate parts.

I claim:

1. A multi-spindle automatic lathe for machining bars of material, said lathe comprising:

a supporting structure, a spindle carrier having a central bore, a plurality of spindles for holding bars (M) to be machined, said spindles being supported by said spindle carrier, and shaping means for shaping bars (M), said shaping means including tool bearing carriages supporting machining tools and being controlled by cams supported and driven in rotation, said lathe being characterized in that said supporting structure comprises a rigid central body and a support shaft extending longitudinally therefrom, said support shaft being immovably fixed relative to said central body, said shaping means being mounted on and around said central body, said support shaft being engaged in said central bore so that said spindle carrier is guided both in rotation and in translation in front of said shaping means by engagement of said support shaft with an interior surface of said spindle carrier bounding said central bore, said shaping means and said spindles being actuated by peripheral driving means surrounding said support shaft.

2. A lathe according to claim 1 characterized in that said shaping means comprises a plurality of modular machining units, each of said machining units including, in an integrated manner, one of said tool bearing carriages and at least one of said cams for displacing said one of said tool bearing carriages.

3. A lathe according to claim 2, characterized in that said lathe includes a plurality of rigid frames mounted on the exterior of said central body, each of said modular machining units including a respective one of said cam shafts supported for rotation on a respective one of said rigid frames.

4. A lathe according to claim 3, characterized in that said modular machining units further include, respectively, driving wheels mechanically anchored respectively to the corresponding cam shafts.

5. A lathe according to claim 4, characterized in that the driving wheels of the modular machining units are driven in concomitant manner by an exterior notched belt surrounding the central body.

6. A lathe according to claim 5, characterized in that the central body provided with the modular machining units is fixedly supported within a non-rigid frame, while the spindle carrier is supported by means of a guide bar fixidly mounted behind the latter.

7. A lathe according to claim 5, characterized in that said rigid frames respectively comprise arms which extend radially therefrom and support idlers arranged to tension said belt on said driving wheels.

8. A lathe according to claim 4, characterized in that the central body provided with the modular machining units is fixedly supported within a non-rigid frame, while the spindle carrier is supported by means of a guide bar fixidly mounted behind the latter.

9. A lathe according to claim 3, characterized in that each rigid frame includes a frontal plate extending radially from the central body, each plate supporting in a rigid manner one end of the cam shaft as well as a guide pipe.

10. A lathe according to claim 9, characterized in that each modular machining unit includes two cams, both supported on a common shaft and directing the same tool bearing carriage.

11. A lathe according to claim 10, characterized in that the central body provided with the modular machining units is fixedly supported within a non-rigid frame, while the spindle carrier is supported by means of a guide bar fixidly mounted behind the latter.

12. A lathe according to claim 9, characterized in that the central body provided with the modular machining units is fixedly supported within a non-rigid frame, while the spindle carrier is supported by means of a guide bar fixidly mounted behind the latter.

13. A lathe according to claim 3, characterized in that the central body provided with the modular machining units is fixedly supported within a non-rigid frame, while the spindle carrier is supported by means of a guide bar fixidly mounted behind the latter.

14. A lathe according to claim 3, characterized in that said modular machining units are mounted around said central body in a planetary arrangement.

15. A lathe according to claim 2, characterized in that the central body provided with the modular machining units is fixedly supported within a non-rigid frame, while the spindle carrier is supported by means of a guide bar fixidly mounted behind the latter.

16. A lathe according to claim 15, characterized in that said non-rigid frame and the guide bar are set on a non-rigid table.

17. A lathe according to claim 15, characterized in that said lathe is suspended from suspending means coupled to the floor.

18. A lathe according to claim 17, characterized in that said lathe is suspended by means of chains or cables surrounding the non-rigid frame and the guard bar, so that said lathe may be provided with an oscillating rotational movement for enabling extraction of machined parts of the bars (M).

19. A lathe according to claim 1, characterized in that said spindle carrier is coupled to actuating means arranged to control the translation of said spindle carrier on said support shaft.

20. A lathe according to claim 18, characterized in that said actuating means comprises a thruster.

21. A lathe according to claim 19, characterized in that said thruster is fixedly mounted onto the support shaft.

22. A lathe according to claim 21, characterized in that said thruster lies in an extension of the support shaft at a free end of said support shaft.

23. A lathe according to claim 1, characterized in that said lathe includes an arrangement for controlling the angular displacement of the spindle carrier.

24. A lathe according to claim 23, characterized in that said arrangement comprises a thruster.

25. A lathe according to claim 24, characterized in that said thruster has a movable portion arranged to displace the spindle carrier angularly.

26. A lathe according to claim 25, characterized in that said movable portion is provided with a finger including a notch arranged to receive the head of an indexing pin projecting exteriorly from the spindle carrier.

27. A lathe according to claim 1 characterized in that said lathe includes means for positioning the spindle carrier angularly with respect to said central body.

28. A lathe according to claim 27, characterized in that said means for positioning the spindle carrier are formed by toothed crowns facing one another and respectively mounted on the central body and the spindle carrier.

29. A lathe according to claim 1, characterized in that said driving means actuating the spindles are formed by a notched belt surrounding the spindles.

* * * * *